US006533585B2

(12) United States Patent
Possidento

(10) Patent No.: US 6,533,585 B2
(45) Date of Patent: Mar. 18, 2003

(54) PERIODIC PYRAMID: CHEMISTRY PUZZLE AND TEACHING DEVICE

(76) Inventor: William Possidento, 83 Colony Ave., Park Ridge, NJ (US) 07656-1048

( * ) Notice: Subject to any disclaimer, the term of this patent is extended or adjusted under 35 U.S.C. 154(b) by 0 days.

(21) Appl. No.: 09/734,602

(22) Filed: Dec. 13, 2000

(65) Prior Publication Data
US 2002/0072044 A1 Jun. 13, 2002

(51) Int. Cl.[7] .............................................. G09B 23/24
(52) U.S. Cl. ...................................................... 434/298
(58) Field of Search ................................ 434/298, 276, 434/278, 280, 281, 282; 273/157 R, 153 P

(56) References Cited

U.S. PATENT DOCUMENTS

| | | | | |
|---|---|---|---|---|
| 85,299 A | * | 12/1868 | Gaines | 434/298 |
| 2,492,563 A | * | 12/1949 | Flickinger | 434/282 |
| 2,891,322 A | * | 6/1959 | Brownlee | 434/282 |
| 3,145,482 A | * | 8/1964 | Edwards | 434/281 |
| 3,423,093 A | * | 1/1969 | Lahav | 434/298 |
| 3,594,923 A | * | 7/1971 | Midgley | 434/282 |
| 3,608,906 A | * | 9/1971 | Odler | 273/157 R |
| 3,724,098 A | * | 4/1973 | McSmith | 434/282 |
| 3,804,417 A | * | 4/1974 | Dawson | 273/134 AE |
| 4,199,876 A | * | 4/1980 | Katz | 434/282 |
| 4,934,701 A | * | 6/1990 | Ting | 273/157 R |
| 5,071,132 A | * | 12/1991 | Ward | 273/243 |
| 5,131,849 A | * | 7/1992 | Perrero | 434/281 |
| 5,265,029 A | * | 11/1993 | Ramsay | 434/298 |
| 5,273,289 A | * | 12/1993 | Morse | 273/237 |
| 6,027,117 A | * | 2/2000 | Goldberg | 273/157 R |
| 6,237,914 B1 | * | 5/2001 | Saltanov | 273/157 R |

FOREIGN PATENT DOCUMENTS

| | | | | |
|---|---|---|---|---|
| GB | 1498951 | * | 1/1978 | G09B/23/26 |
| SU | 1485293 | * | 6/1989 | G09B/23/24 |

OTHER PUBLICATIONS

David S. Jackson, "Periodic Table Puzzle", <http://www.his.com/~geoworks/PeriodicC_Puzzle.html>, Aug. 1, 1998.*

* cited by examiner

Primary Examiner—Derris H. Banks
Assistant Examiner—Kurt Fernstrom
(74) Attorney, Agent, or Firm—John P. Halvonik

(57) ABSTRACT

A puzzle apparatus for the study of chemistry and based upon the Zmaczynski equilateral triangular model of the periodic table of the chemical elements. A pyramid shape is used as a puzzle base and it has a series of apertures that represent the positions of the elements in the periodic table. The apertures are used to hold and display rhombohedral shaped puzzle pieces that represent the elements of the periodic table. Each of the puzzle pieces has six faces, and each face is able to hold relevant information pertaining to that element and to enable the student to use the information to replace the element into its correct position in the table of elements.

3 Claims, 5 Drawing Sheets

PERIODIC PYRAMID: CHEMISTRY PUZZLE AND TEACHING DEVICE

FIELD AND BACKGROUND OF THE INVENTION

The invention relates to the field of teaching devices and, in particular, to a puzzle based upon the periodic table of the chemical elements which involves rhombohedral shaped pieces that are fitted into a pyramidal shaped base having apertures for the pieces. The pyramid shaped base represents a triangular shaped representation of the periodic table of elements that reflects that presentation developed by Zmaczynski, Booth and Wagner.

In the present invention, the Zmaczynski equilateral triangle representation of the elements is thus represented by the structure of the puzzle having a pyramidal shape with several faces (a pyramid with a triangular base or a rectangular base may be used in the invention). Any or all of the faces may be used to present the apertures in a triangular shape that corresponds to the display of elements in the Zmaczynski presentation. Apertures in the face correspond to each of the pieces and are used to secure the placement of the rhombohedral shaped pieces. The challenge for the student is to use the information on the pieces (e.g. electron configuration) and use that to place the those elements (really the pieces) into the correct apertures in the puzzle and, thus, in the correct relationship with the other elements.

PRIOR ART

While there are three dimensional puzzles that are known in the prior art, none of them are based upon a triangular framework that represent the display of the chemical elements. Nor are there known any chemistry puzzles that are based upon the Zmaczynski equilateral triangle representation of the periodic table of elements. Nor for that matter, are there any known chemical puzzles based upon completing a puzzle of the periodic chart in a triangular representation.

SUMMARY OF THE INVENTION

A puzzle apparatus for the study of chemistry and based upon the Zmaczynski equilateral triangular model of the periodic table of the chemical elements. The puzzle is in the form of a pyramid having a series of apertures in at least one of the faces of the pyramid. The apertures may resemble a honeycombed structure. Puzzle pieces representing the elements of the periodic table are placed into the apertures in the face of the pyramid in order to complete the periodic table in the manner suggested by the Zmaczynski representation.

Each of the puzzle pieces is rhombohedral shaped and thus has six faces, each able to contain information pertaining to that element. The student will use this information in order to replace the pieces into their correct position in the pyramid according to the placement established by the Zmaczynski representation.

In order to make the puzzle more challenging to the student, it is necessary that duplicate information be given on three of the faces of rhomboid; so in effect the six faces of the rhomboid shaped piece will hold only 3 distinct pieces of information (such as electronic configuration, chemical name, oxidation state, etc.). Otherwise, because the nature of the rhomboid gives each face a right-handedness or a left-handedness; the handedness of the face will give away to the student which part of the puzzle that piece belongs to and so make the puzzle that much easier to solve.

It is an object of the invention to provide a learning puzzle that is enjoyable to do and encourages students to recall and to understand those spatial relationships of the elements as depicted in the Zmaczynski equilateral triangle presentation of the periodic table.

Another object of the invention to provide a learning puzzle for allowing students to construct a periodic table displaying the elements in a triangular shape along the lines of the Zmaczynski presentation.

Another object of the invention to provide a learning puzzle to provide students with a triangular shaped version of the periodic table and to challenge them to fill up the empty table with pieces corresponding to the various elements that make up the table.

Another object is to provide a provide a learning puzzle to study the Zmaczynski equilateral representation of the periodic table and to understand the relationships of the elements with one another according to this presentation.

Other advantages will be seen by those skilled in the art once the invention is shown and described.

DESCRIPTION OF THE PREFERRED EMBODIMENT

Figure 1:
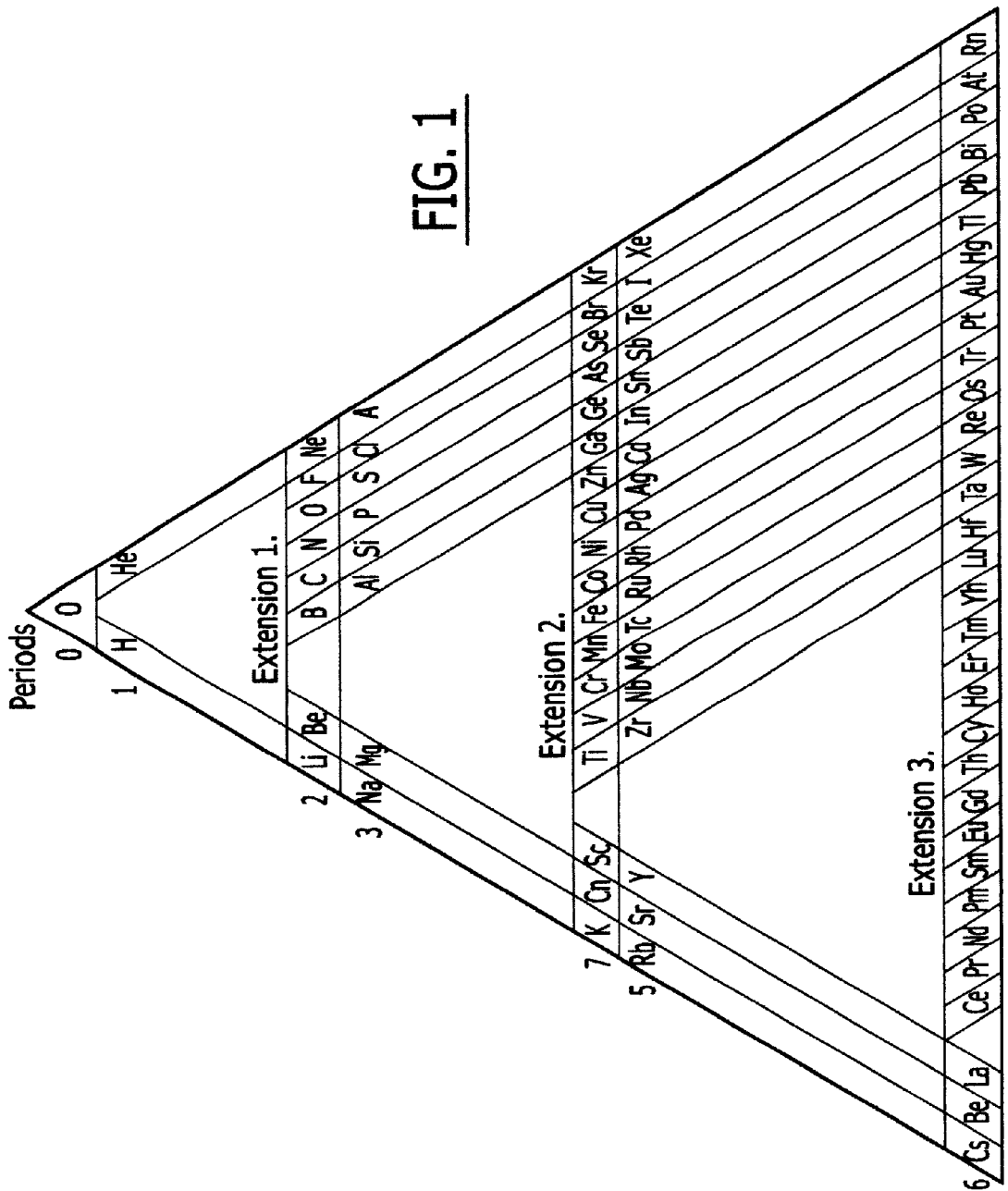
FIG. 1 periodic table based upon the Zmaczynski equilateral triangular representation.

The overall equilateral triangular periodic table that forms the basis for this puzzle is shown in FIG. 1. This triangular representation is attributed to the work of Zmaczynski and also to the work of Wagner and Booth and displays the elements starting with the lightest, Hydrogen, at the top of the triangle and works its way downward through all the elements. The rows of the triangle correspond to those rows in the standard periodic table.

Figure 2:
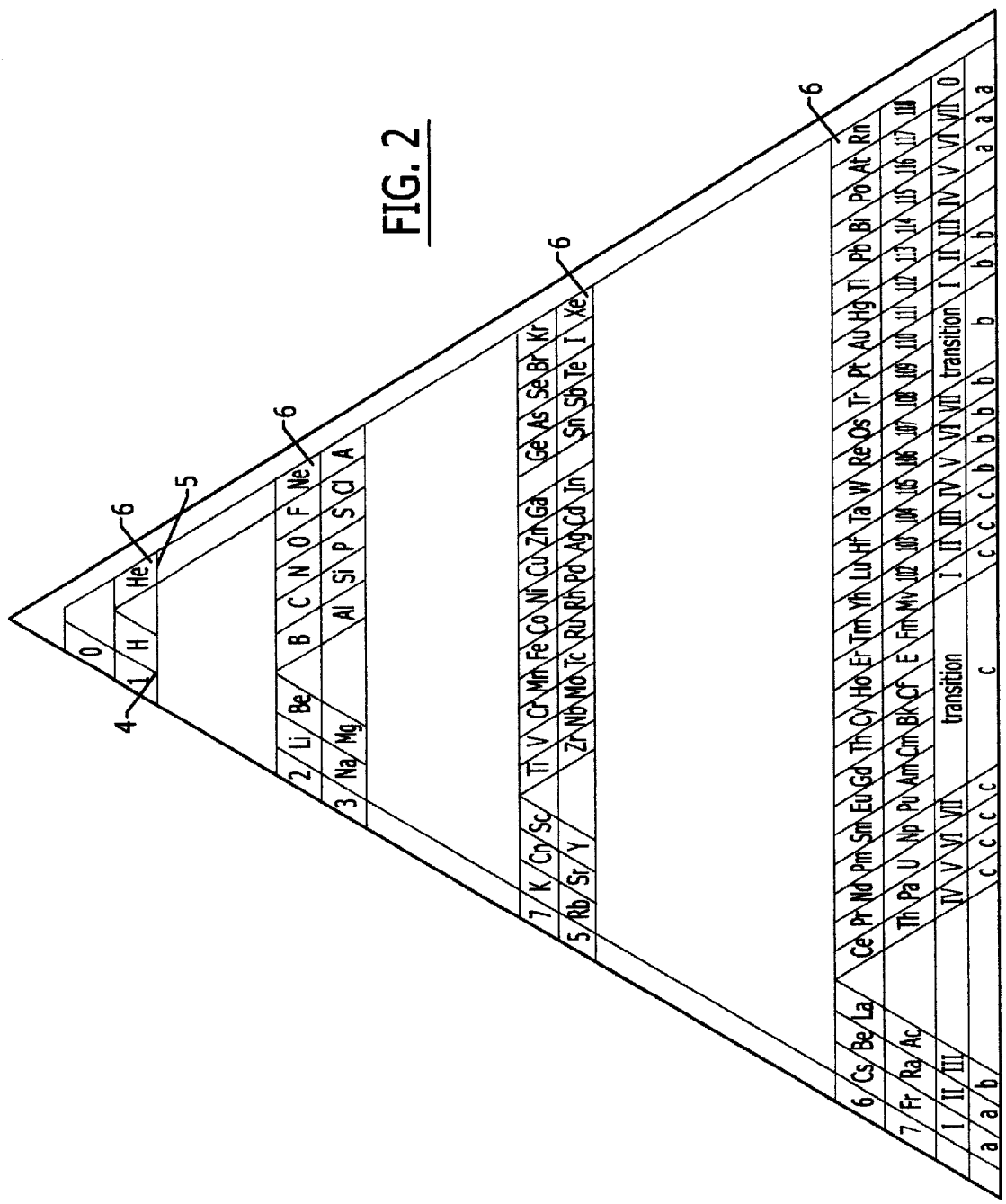
FIG. 2 side of one face of the pyramid puzzle showing rhombohedral shaped pieces correctly fitted into the apertures in the puzzle.
Figure 3:
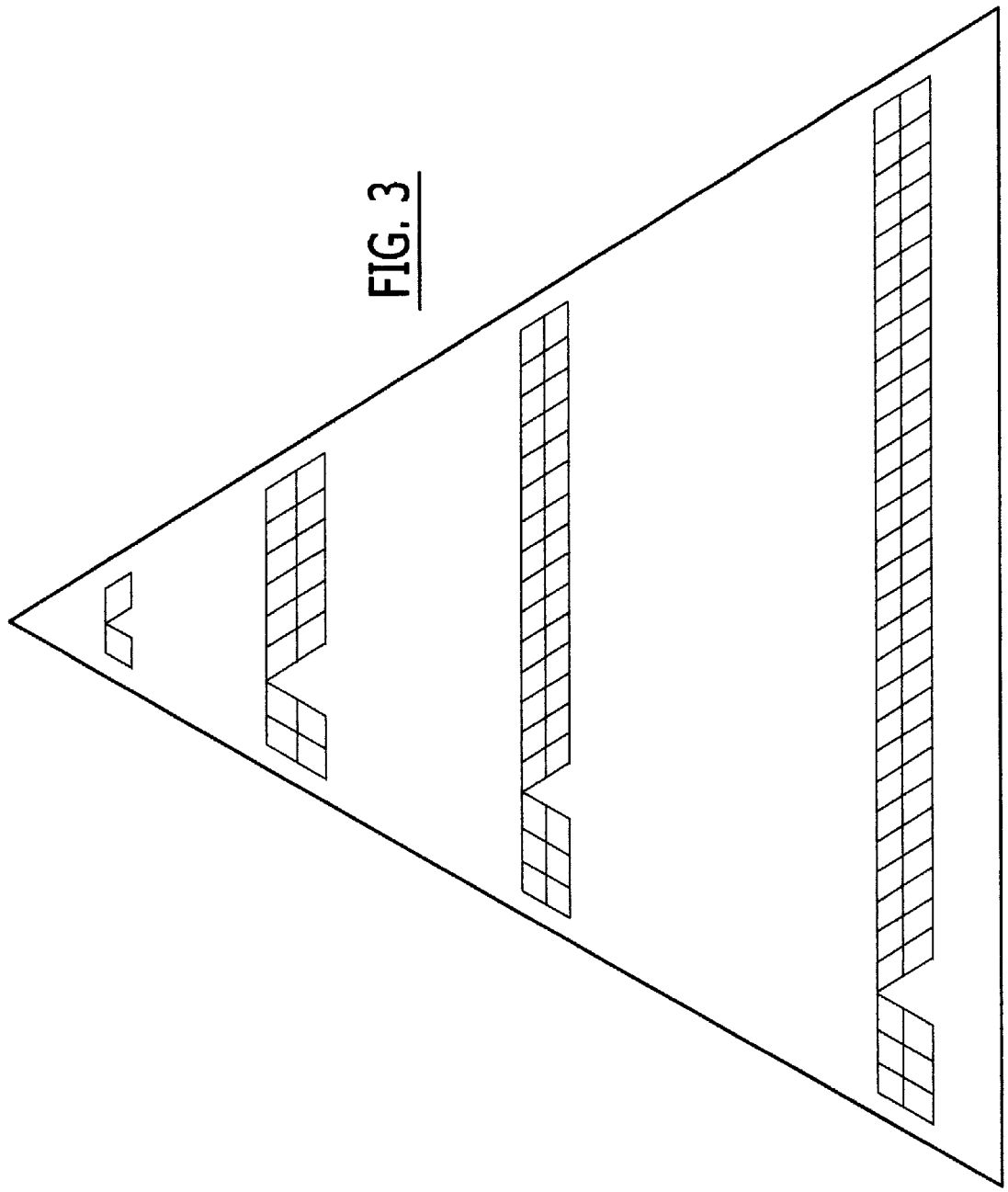
FIG. 3 detailed view of honey combed shaped apertures used in the face of the pyramid.

It should be noted in the Zmaczynski display that the those graphical depictions on the left hand side of the triangle are right ward leaning and those on the right hand side are leaning to the left, see FIGS. 1 and 2. For instance, the Hydrogen box 4 (symbol "H") is leaning to the right and Helium 5 (symbol "He") adjacent to Hydrogen is leaning to the left. The same dichotomy is apparent throughout the rest of this table.

The dichotomy is not necessarily even in any given row, that is: there are not equal numbers of rightward leaning and leftward leaning apertures in the display of any given row (exception: first row of Helium and Hydrogen).

The pyramid face, shown in FIG. 2, thus has a series of apertures 6 that correspond to those same rhombohedral shaped depictions that are used in the Zmaczynski display to display each of the elements. Thus the apertures in the pyramid face are rhombohedral shaped and lean in the direction appropriate for that element that corresponds to that position in the periodic table so as to conform to the equilateral triangular presentation. Thus the shape as well as the placement of each aperture on the face of the pyramidal puzzle corresponds to an element in the Zmaczynski presentation.

Figure 6:
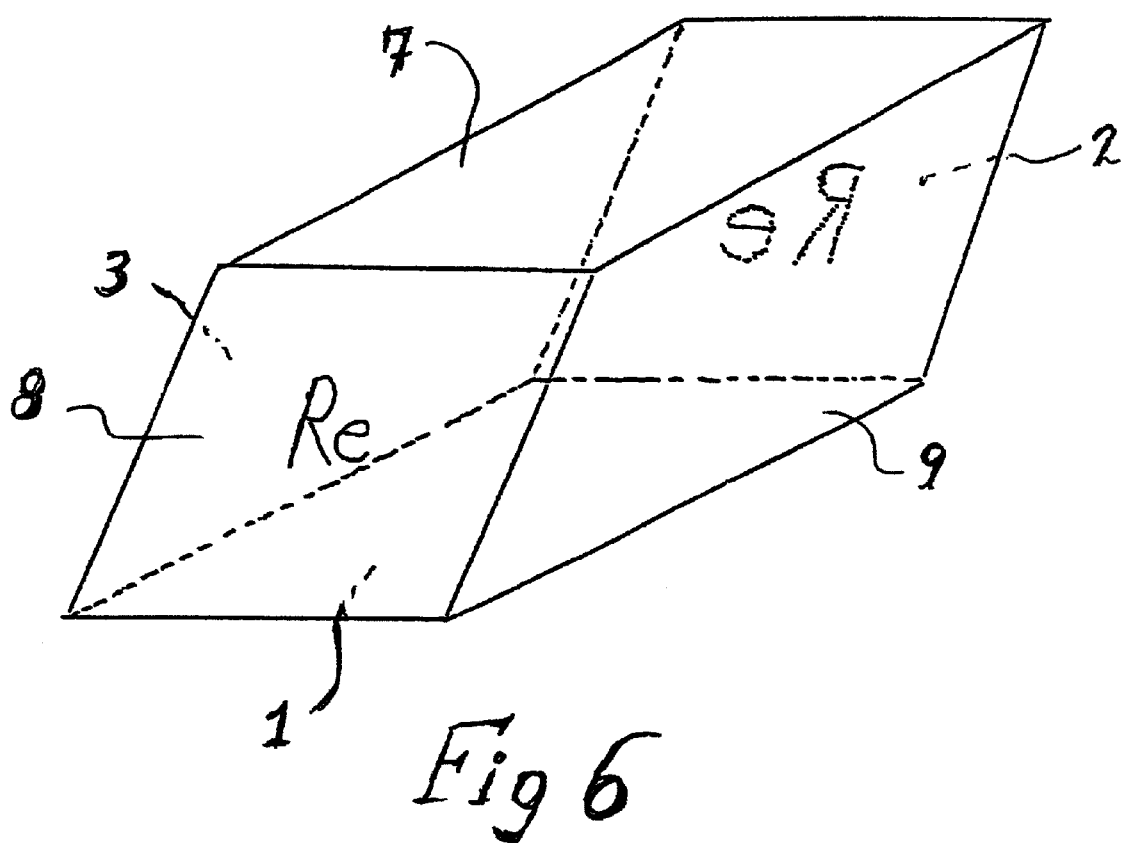
FIG. 6 view of rhombohedral shaped puzzle piece.

The second part of the invention are the puzzle pieces that are fit into the apertures in the pyramid. See FIG. 6. Each piece is three dimensional and each face is (1–3, 7–9) is rhombohedral shaped. Each piece, of course, represents an element from the periodic table. Each of the faces of the piece can be used to display information such as: chemical name, chemical symbol, electronic configuration, oxidation states, boiling point, etc. Each face could display more than one bit of information, for example, it might be more appropriate to display both the chemical name and the symbol on the same face.

In order to make the puzzle more challenging to the student, it is necessary that duplicate information be given on three of the faces of rhombohedron; so in effect the six faces of the rhombohedral shaped piece will hold only 3 distinct pieces of information (such as electronic configuration, chemical name, oxidation state, etc.). Otherwise, because the nature of the rhombohedron gives each face a right-handedness or a left-handedness; the handedness of the face will give away to the student which side of the puzzle that piece belongs to and so make the puzzle that much easier to solve.

The challenge for the student is to place the rhombohedral shaped pieces corresponding to each of the elements of the periodic table into their correct positions on the face of the pyramid. The student may use the chemical information from one side or several sides of the piece.

Each of the rhombohedral shaped pieces should have on it, as a minimum, the atomic number of that element and probably its electron configuration information as well. This information can and should be used by the student to learn how to fit the tiles into the puzzle framework. Eventually, the student may be facile enough to simply put the pieces into the framework based upon the name or the atomic number alone; however the puzzle is a learning experience and should include the electron configuration information for the sake of making the model complete. See FIG. 6.

Figure 5:
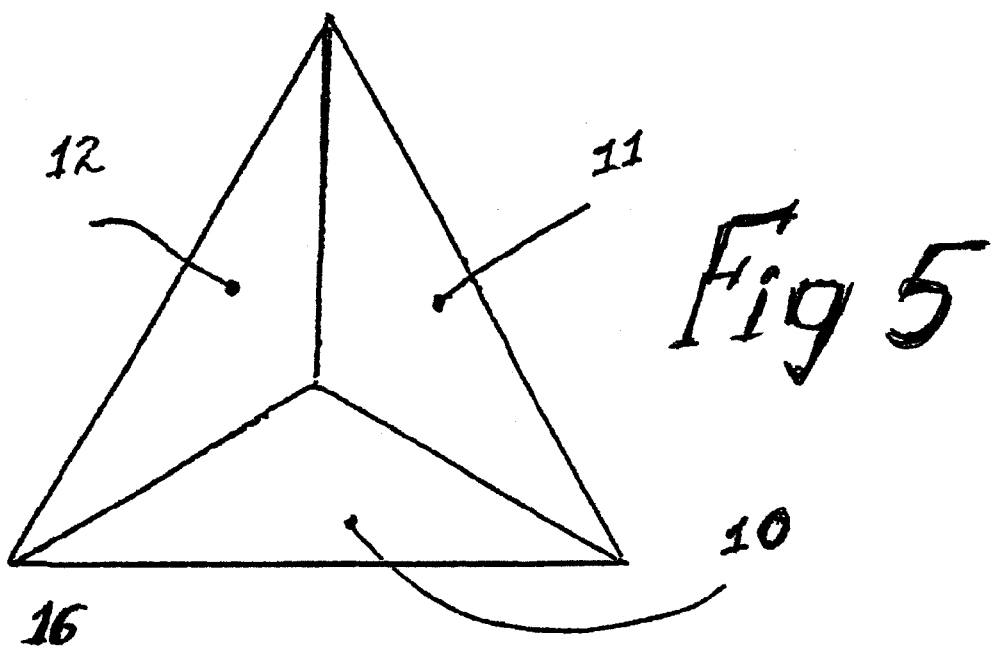
FIG. 5 top view of a tetrahedral shaped pyramid showing the three different faces.
Figure 4:
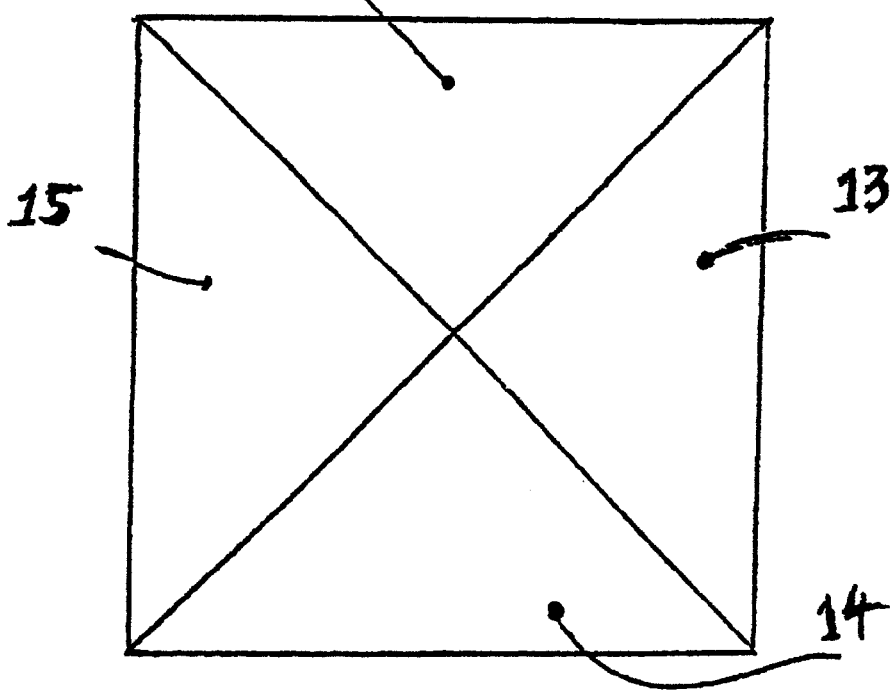
FIG. 4 top view of a pyramid with a square base and showing four different faces with different types of information.

The pyramid base of the puzzle may be in several forms including a pyramid with a triangular base (See FIG. 5) or one having a rectangular base (see FIG. 4). In the former case, the pyramid will have three useful or inclined faces (10–12) (those faces other than the bottom surface). In this case, the bottom surface may have information allowing it to serve as an answer key or it may have no information of any kind. In the latter case (one with a rectangular base); four useful or inclined faces (13–16) would be used.

Each of these useful faces could be used to display a different set of faces of the pieces. For instance, one side (11, 13) of the pyramid could display those faces of the rhombohedron pieces that display the electronic configuration information; another side (12, 15) could display the elements by name, a third side (10–14) could display only the element symbols and a fourth side 16 could display chemical properties. See FIGS. 4 and 5. These show how the different inclined faces can be used to display a different set of information from the information contained on the pieces. One face could display the pieces having the electronic configuration displayed, another face could take the same set of pieces and display the oxidation states information of each of the pieces, or the boiling pt. melting pt. data, etc.

Using the puzzle in this manner (with optional displays of information) will thus reinforce and help the student understand the concepts involved in the Zmaczynski presentation of the elements which presents the elements in relationship to one another and of course it follows that the chemical properties of these elements will also have logical relationships to one another.

In addition to the basic structure, described above, the puzzle may come with face covers that snap into place or attach to the faces with hinges could be used to keep the pieces from falling out or to serve as trays or holders for the pieces when the puzzle is in use.

The pyramid base may be comprised of for example: wood plastic or other materials that may be applicable. The rhombohedral shaped pieces may be made of various materials including wood, plastic, etc.

I claim:

1. A two part teaching puzzle apparatus based upon the Zmaczynski presentation of the periodic table, said apparatus comprising: a first part base having a pyramidal shape and having a bottom surface having at least three edges; said base having at least three triangular shaped presentation surfaces in connection with one of said bottom edges, at least one of said presentation surfaces having a plurality of apertures, each of said apertures of rhombohedral shape; each of said apertures corresponding to an element representation in the Zmaczynski triangular periodic table and said apertures arranged upon said presentation face so as to reflect the arrangement of said elements in the Zmaczynski triangular periodic table;

and, a second part comprising a set of rhombohedral shaped pieces, each of said rhombohedral shaped pieces sized and shape to fit said apertures of rhombohedral shape; each of said pieces having six faces, said faces being three sets of paired faces, said paired faces at opposite ends of said rhombohedral shaped piece, at least one of said paired sets of faces having information pertaining to a chemical property of an element in the Zmaczynski triangular periodic table.

2. The apparatus of claim 1, wherein said pyramid shaped base has four triangular shaped presentation surfaces.

3. The apparatus of claim 2 wherein said pyramid shaped base has three triangular shaped presentation surfaces.

* * * * *